US005095448A

United States Patent [19]

Obuchi et al.

[11] Patent Number: 5,095,448

[45] Date of Patent: Mar. 10, 1992

[54] DATA DISPLAYING APPARATUS WITH NOVEL GRAPHIC POSITION AND RATIO DISPLAY MEANS

[75] Inventors: Yasuji Obuchi, Kitakatsuragi; Akira Hamada, Abeno; Hideo Miyoshi; Hirokatsu Akiyama, both of Nara, all of Japan

[73] Assignee: Sharp Kabushiki Kaisha, Osaka, Japan

[21] Appl. No.: 464,855

[22] Filed: Jan. 17, 1990

[30] Foreign Application Priority Data

Jan. 19, 1989 [JP] Japan .................................... 1-10157

[51] Int. Cl.[5] ............................................ G06F 15/62

[52] U.S. Cl. ..................................... 395/144; 395/155

[58] Field of Search ................ 364/518, 521; 340/706, 340/709

[56] References Cited

U.S. PATENT DOCUMENTS 4,862,390 8/1989 Weiner ................................ 364/521

4,989,610 2/1991 Patton et al. ............... 364/413.06 X 5,001,697 3/1991 Torres ................................ 364/521

*Primary Examiner*—Heather R. Herndon

*Assistant Examiner*—Mark K. Zimmerman

*Attorney, Agent, or Firm*—Nixon & Vanderhye

[57] ABSTRACT

A data displaying apparatus including a storing device for storing one or more data, a displaying device for displaying one or more data stored in the storing device on a screen and a processor, wherein the processor calculates a sum of the maximum lengths to the left and right of a predetermined position within each data which can be displayed on the screen by left scrolling and right scrolling from the predetermined position to determine the maximum display data, also calculates the position and the ratio in the lateral direction of display data displayed on the screen with respect to the maximum display data, displays the calculated position and ratio on the screen in a graphic form, and also displays the display data on the screen while justifying it at the above-mentioned predetermined position.

10 Claims, 7 Drawing Sheets

5
PRINTING APPARATUS
PRINTER
2
EXTERNAL MEMORY
HARDDISK
3
CONTROLLING APPARATUS
MICROCOMPUTER
4
DISPLAYING APPARATUS
BIT MAP DISPLAY
1
INPUTTING APPARATUS
MOUTH AND KEYBOARD

FIG. 2

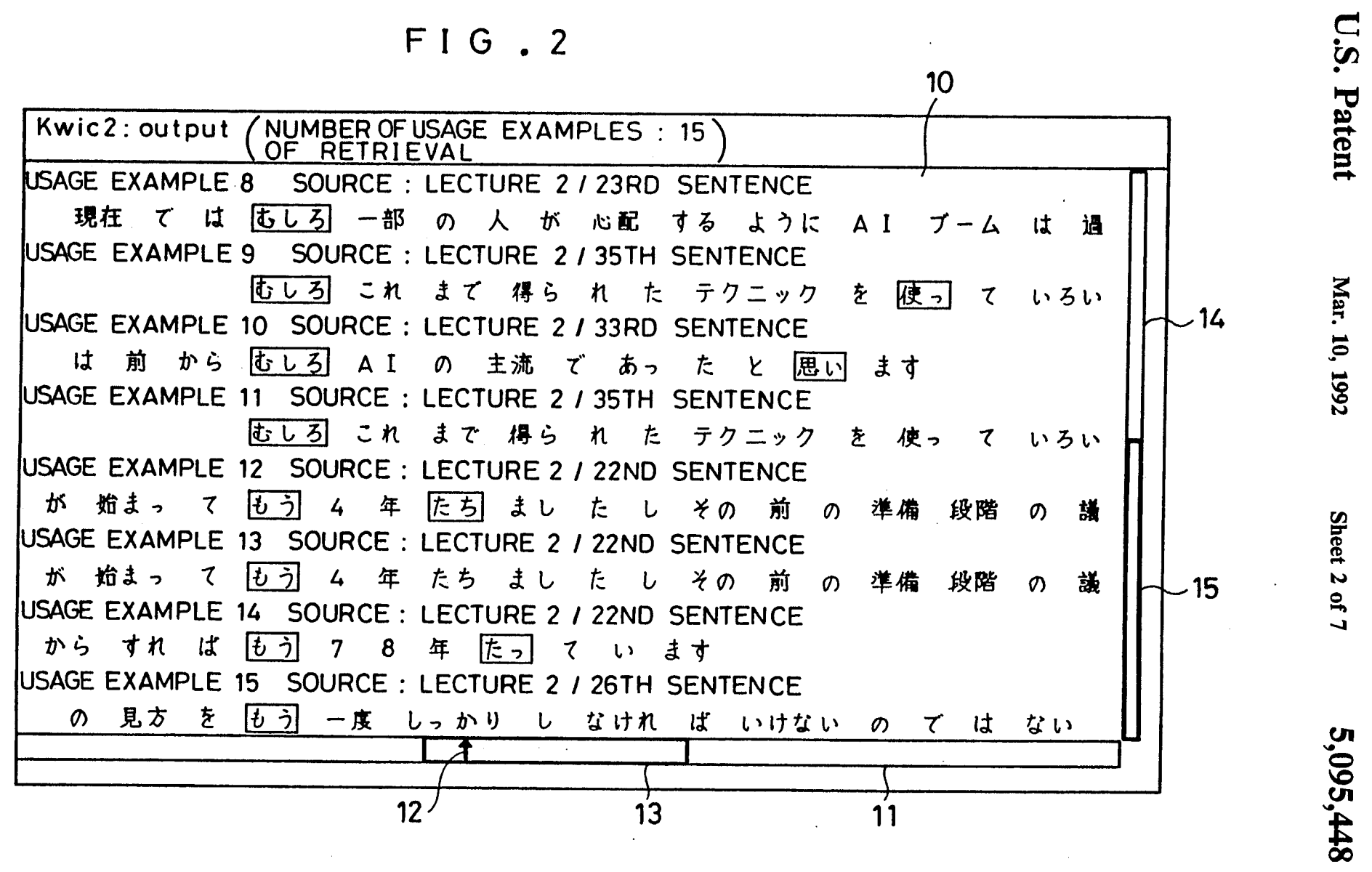

Kwic2: output (NUMBER OF USAGE EXAMPLES OF RETRIEVAL : 15)

USAGE EXAMPLE 8 SOURCE : LECTURE 2 / 23RD SENTENCE

現在では むしろ 一部の人が心配するように AI ブームは過

USAGE EXAMPLE 9 SOURCE : LECTURE 2 / 35TH SENTENCE

むしろ これまで得られたテクニックを 使っ ていろい

USAGE EXAMPLE 10 SOURCE : LECTURE 2 / 33RD SENTENCE

は前から むしろ AIの主流であったと 思い ます

USAGE EXAMPLE 11 SOURCE : LECTURE 2 / 35TH SENTENCE

むしろ これまで得られたテクニックを使っていろい

USAGE EXAMPLE 12 SOURCE : LECTURE 2 / 22ND SENTENCE

が始まって もう 4年 たち ましたしその前の準備段階の議

USAGE EXAMPLE 13 SOURCE : LECTURE 2 / 22ND SENTENCE

が始まって もう 4年たちましたしその前の準備段階の議

USAGE EXAMPLE 14 SOURCE : LECTURE 2 / 22ND SENTENCE

からすれば もう 7 8年 たっ ています

USAGE EXAMPLE 15 SOURCE : LECTURE 2 / 26TH SENTENCE

の見方を もう 一度しっかりしなければいけないのではない

10 11 12 13 14 15

CALCULATION OF LATERAL RANGE OF DISPLAY
207a
M1 + M2 → MAXIMUM CHARACTER STRING M3
207b
LATERAL LENGTH OF DISPLAY WINDOW / M3 → RH
207c
NUMBER OF DISPLAY COLUMNS → P1
207d
P1 x RH → LENGTH OF LATERAL SCROLL BAR
207e
NUMBER OF COLUMNS FROM LEFT END OF DISPLAY WINDOW TO POSITION OF KEY WORD → P2
207f
M1 - P2 → L
207g
L x RH → POSITION OF LATERAL SCROLL BAR
207h
M1 x RH → POSITION OF DISPLAY MARKER
RETURN

DATA DISPLAYING APPARATUS WITH NOVEL GRAPHIC POSITION AND RATIO DISPLAY MEANS

BACKGROUND OF THE INVENTION

1. Field of the Invention

The present invention relates to a data displaying apparatus for displaying data stored in a memory on a screen of a displaying apparatus such as a CRT display.

2. Description of the Related Arts

In information processing apparatus such as a word processor which can store writing data in a memory, various apparatus such as MACINTOSH are employed for showing a relationship between writing data and a display screen For instance, as shown in FIG. 7, a longitudinal scale 21 and a lateral scale 22 are installed on a screen 20 of a displaying apparatus. A length from the top line to the bottom line of a whole sentence data 23 which can be displayed on the screen 20 by scrolling is taken as a sentence length 24. The ratio of a longitudinal length of the sentence data displayed on the current screen 20 to a sentence length 24 and a longitudinal position of the displayed sentence data with respect to the whole sentence data 23 are shown by the portion encompassed by a thick line on the longitudinal scale 21 as shown in FIG. 7 where the total length of the longitudinal scale 21 is taken as the sentence length 24.

Also, a lateral width of paper on which the sentence data 23 are to be printed is taken as a paper width 25. A ratio of the lateral width of the sentence data displayed on the current screen 20 to the paper width and a lateral position of the displayed sentence data with respect to the paper are shown by the portion encompassed by a thick line on the lateral scale 22 where the total length of the lateral scale 20 is taken as the paper width 25.

However, in the case of an information retrieval system such that sentence data is retrieved from a data base consisting of the sentence data, when one retrieved sentence data corresponds to one line of display and sentences are displayed with retrieval keywords justified, the sentence data exceed the lateral width of the display screen.

Accordingly, it is necessary to know information on the current display position with respect to the whole of the retrieved sentence data rather than information on the lateral position with respect to the lateral width of the paper.

OBJECT AND SUMMARY OF THE INVENTION

The present invention is to provide a data displaying apparatus which displays a position and a ratio in the lateral direction of sentence data displayed on a screen with respect to the whole of the retrieved sentence data on the above-described lateral scale.

In accordance with the present invention, it provides a data displaying apparatus which comprises storing means for storing one or more data, displaying means for displaying one or more stored data on a screen as display data, data length calculating means for calculating a sum of the maximum data lengths of left and right which can be displayed on the screen by left scrolling and right scrolling from a predetermined position as the maximum display data, position calculating means for calculating a position in the lateral direction of display data displayed on the screen, ratio calculating means for calculating a ratio in the lateral direction of the display data displayed on the screen with respect to the maximum display data calculated by the data length calculating means, and display controlling means for displaying the position and the ratio of the display data calculated by the position calculating means and the ratio calculating means on the screen in graphic form, and for displaying the display data on the screen while justifying it at the above-mentioned predetermined position.

By adopting such a construction, when data stored in the storing means is displayed on the screen of the displaying means, a sum of the maximum data lengths of left and right is calculated by the data length calculating means as the maximum display data.

The position in the lateral direction of the display data displayed on the screen is calculated by the position calculating means, the ratio in the lateral direction of the display data displayed on the screen with respect to the maximum display data is calculated by the ratio calculating means, and the position and the ratio of the display data displayed on the screen are displayed on the screen in a graphic form and the display data is displayed on the screen while justifying it at a predetermined position by the display controlling means.

Accordingly, the position and the ratio of the data displayed on the screen with respect to the whole data can be recognized on the display screen.

BRIEF DESCRIPTION OF THE DRAWINGS

FIG. 2 is an explanatory view showing an example of usage displayed on a display window in accordance with the present invention.

FIG. 7 is an explanatory view showing an example of the conventional display having the longitudinal and the lateral scales.

DESCRIPTION OF THE PREFERRED EMBODIMENT

For the data length calculating means, the position calculating means, and the ratio calculating means and the display controlling means in the present invention, a micro computer consisting of a CPU, ROM, RAM and I/O part is conveniently used, and for the storing means, normally a RAM thereof is used.

Also, the displaying means has only to be capable of displaying contents stored in the storing means on the screen, and a displaying apparatus such as a CRT display, a liquid crystal (LC) display or an EL display can be used for this means.

Hereinafter, detailed description is made on the present invention based on an embodiment as shown in drawings In addition, the present invention is not limited by the following description.

Figure 1:
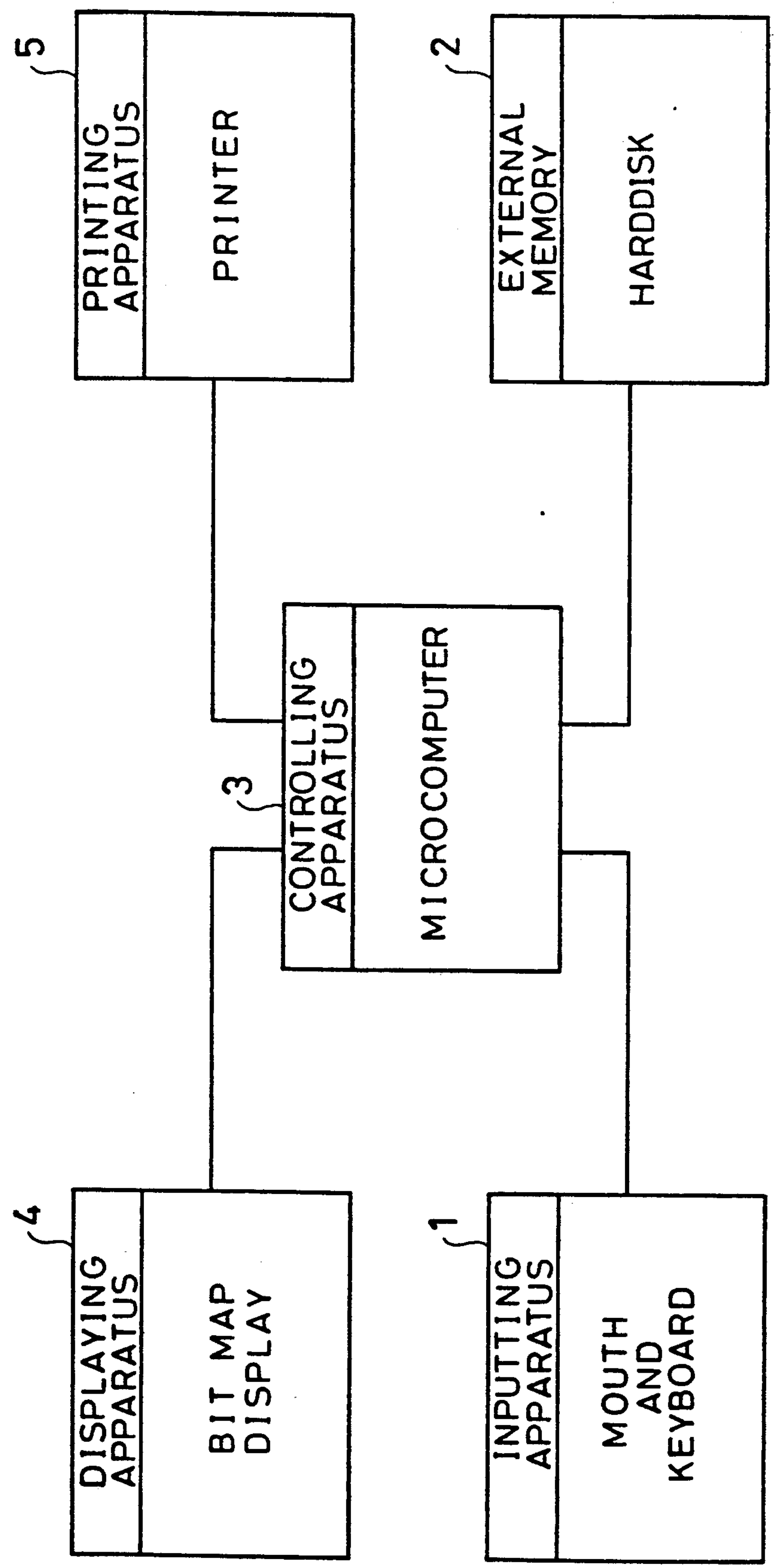
FIG. 1 is a configuration block diagram showing an embodiment of the present invention.

FIG. 1 is a configuration block diagram showing an embodiment of the present invention In FIG. 1, numeral 1 designates an inputting apparatus consisting of a keyboard provided with Japanese Kana character keys and function keys and a mouse, which inputs sentence data and various indicating data.

Numeral 2 designates an external memory consisting of a harddisk, which stores usage of the Japanese language for studying language Numeral 3 designates a controlling apparatus configured with a CPU, ROM, RAM and I/O port, which retrieves one or a plurality of usage examples of Japanese language conforming to a retrieval key word inputted from the inputting apparatus 1 from the external memory 2, and thereafter reads and stores them in the RAM. Numeral 4 designates a displaying apparatus consisting of a bit-map display, for example, a CRT display, which converts the usage examples of Japanese language stored in the RAM of the controlling apparatus 3 into display data, and displays them on the display window of the screen. Numeral 5 designates a printing apparatus, which is a printer for printing the usage examples of Japanese language stored in the RAM.

When the usage examples of Japanese language stored in the RAM are displayed on the screen of the displaying apparatus 4, the controlling apparatus 3 first sets a position and a size of the display window of the screen of the displaying apparatus 4.

Since the retrieval data, that is, the usage examples of Japanese language stored in the RAM are sentences, generally the length of each sentence is approximately 30–50 characters and approximately 100–150 characters at maximum, and a position of a retrieval keyword can be the top or the last of a sentence. Where such a sentence is displayed, the controlling apparatus 3 controls in a manner that one sentence corresponds to one line of display, and is displayed on the display window of the screen of the displaying apparatus 4 with its position justified by the retrieval keyword.

Also, after the position justification by the retrieval keyword, a maximum length of the preceding portion of a sentence which can be displayed by left scrolling and the maximum length of the remaining portion of a retrieved sentence which can be displayed by right scrolling are counted, and the former is added to the latter to determine the maximum display data in the lateral direction.

Furthermore, with respect to the maximum display data, a position and a ratio in the lateral direction of the display data displayed on the display window are calculated.

The position and the ratio of the display data with respect to the maximum display data are then displayed in graphic form in the lower part of the display window, and the position of the keyword is indicated by an arrow as a marker.

This means that the ratio of the lateral width of the display window to the maximum lateral width of the display data is evaluated, and the relative state in the lateral direction of the display window and the position of the retrieval key word are displayed in the lower part of the display window.

Also, in the longitudinal direction, a ratio of the longitudinal length of the display window to a longitudinal length of the display data is evaluated, and the relative state in the longitudinal direction of the display window is displayed in the right end of the display window, FIG. 2 is an explanatory view showing an example of usage displayed on the display window.

As shown in FIG. 2, each sentence is a usage example of Japanese language and each is displayed in one line of the display.

Each of the sentences shown in FIG. 2 consists of a main sentence comprising a retrieval keyword, and a usage number and a source thereof displayed in the line just above the main sentence line, and these sentences are displayed with their positions justified by retrieval keywords of "mushiro" and "mou" respectively.

A lateral frame 11 is then displayed in the lower part of the display window 10 wherein the whole length of a thin frame represents the maximum data length in the lateral direction of the display data, and in the lateral frame 11, a display marker 12 indicating the position of the retrieval keyword and a lateral scroll bar 13 indicating the position and the ratio of the display data with respect to the lateral frame 11 are displayed.

Similarly, also in the longitudinal direction, a longitudinal frame 14 is displayed in the right end of the display window 10, wherein the whole length of a thin frame represents the maximum data length in the longitudinal direction of the display data, and in the longitudinal frame 14, a position and a ratio of the display data with respect to the longitudinal frame 14 are displayed by a longitudinal scroll bar 15.

Hereinafter, description is made on operations in such a configuration based on flowcharts as shown in FIG. 3 through FIG. 6.

Figure 3:
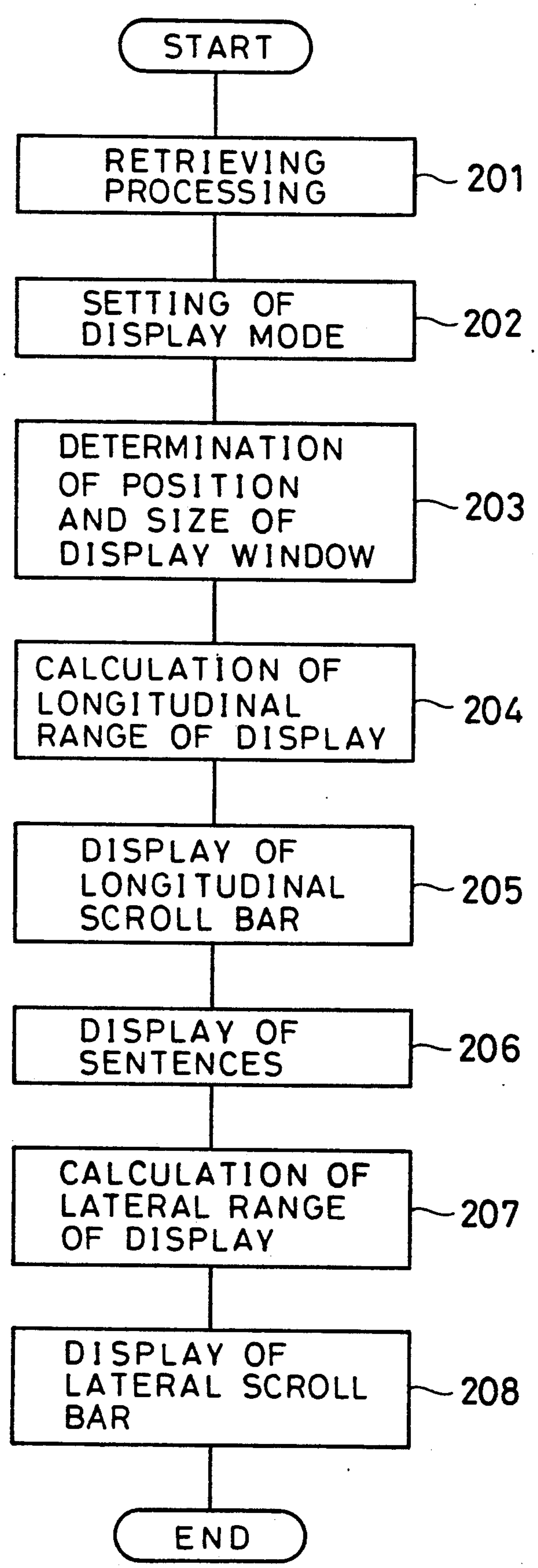
FIG. 3 through FIG. 6 are flowcharts showing operations of an embodiment of the present invention.

FIG. 3 is a flowchart showing a processing operation of the controlling apparatus 3.

First, when a retrieval keyword is inputted from the inputting apparatus 1 and a retrieval is directed, a retrieving processing is performed by the controlling apparatus 3, and a sentence conforming to the retrieval keyword is retrieved and read from the external memory 2, to be stored in the RAM in the controlling display 3 (Step 201).

Next, the display mode whereby the display sequence of the stored sentences is specified (Step 202) is set, and a position and a size of the display window 10 are determined by the mouse of the inputting apparatus 1 (Step 203).

The longitudinal display range of the display data is then calculated (Step 204), the longitudinal scroll bar 15 is displayed (Step 205), and the sentences are displayed (Step 206).

Furthermore, the lateral display range of the display data is calculated (Step 207), and the lateral scroll bar 13 and the display marker 12 are displayed (Step 208).

Figure 4:
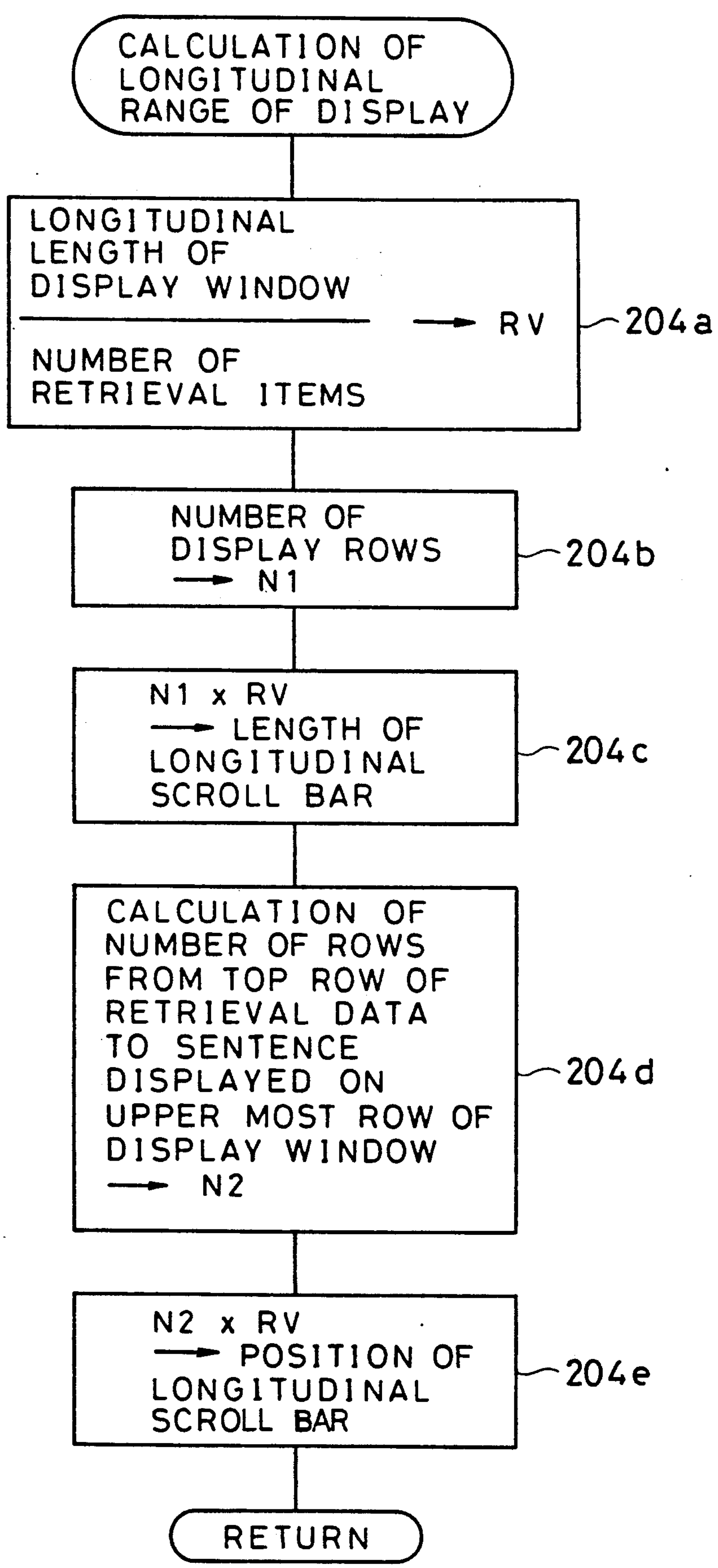

FIG. 4 is a detailed flowchart of calculation of the longitudinal display range in Step 204 of FIG. 3.

In the calculation of the longitudinal display range, first, the longitudinal length of the display window shown in dots is divided by the number of retrieved sentences and the divided length is taken as RV (unit, dot) (Steps 204*a*).

Next, the number of rows to be displayed in the display window 10 is calculated, being taken as N1 (Steps 204*b*), and the length of the longitudinal scroll bar 15 is calculated in dots from N1×RV (Step 204*c*).

The number of rows from the top row of the retrieval data to the sentence displayed on the uppermost row of the display window, that is, the number of rows of sentences hidden above the display window 10 is calculated, being taken as N2 (Step 204*d*), and the position of the longitudinal scroll bar 15 is calculated in dots from N2×RV (Step 204*e*).

Figure 5:
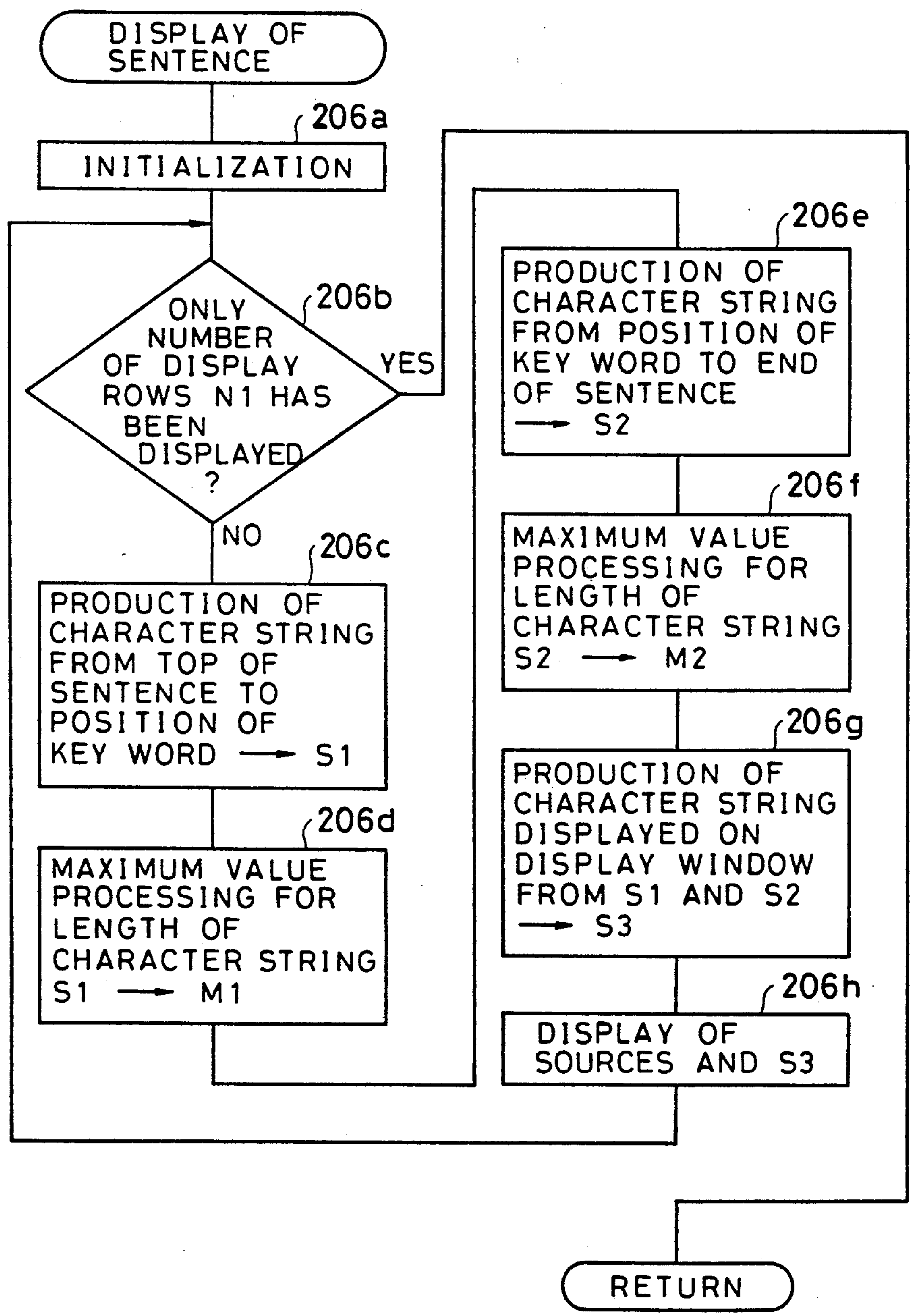

FIG. 5 is a detailed flowchart of display of sentences in Step 206 of FIG. 3.

In the display of sentences, first, initialization is performed to clear a memory for temporary storage required for processing of sentence display (Step 206*a*).

Next, judgment is made on whether or not all of display of N1 rows calculated in the calculation of the longitudinal display range in FIG. 4 has been performed (Step 206b).

When the display of N1 rows has not been performed in this judgment, a character string from the top of the sentence to the position of the retrieval keyword is generated for each sentence, being taken as S1 (Step 206c), and processing of the maximum value is performed for the length of the character string SI, and the maximum value is taken as M1 (Step 206d).

Similarly, a character string from the position of the retrieval keyword to the last of the sentence is generated for that sentence, being taken as S2 (Step 206e), and processing of the maximum value for the length of the character string S2 is performed, and the maximum value is taken as M2 (Step 206f), and a character string to be displayed on the display window is generated for one sentence based on S1 and S2, being taken as S3 (Step 206g), and the usage example number, the source and S3 are displayed on the display window 10 (Step 206h).

By the processing as described above, the processing for one sentence is completed, and by repeating Step 206c—Step 206h hereafter, the maximum value among the lengths from the top to the retrieval keyword of each sentence is taken as M1, and the maximum value among the lengths from the retrieval keyword to the last of each sentence is taken as M2.

When only the number of display rows N1 is displayed in Step 206, the sentence displaying processing is completed.

Figure 6:
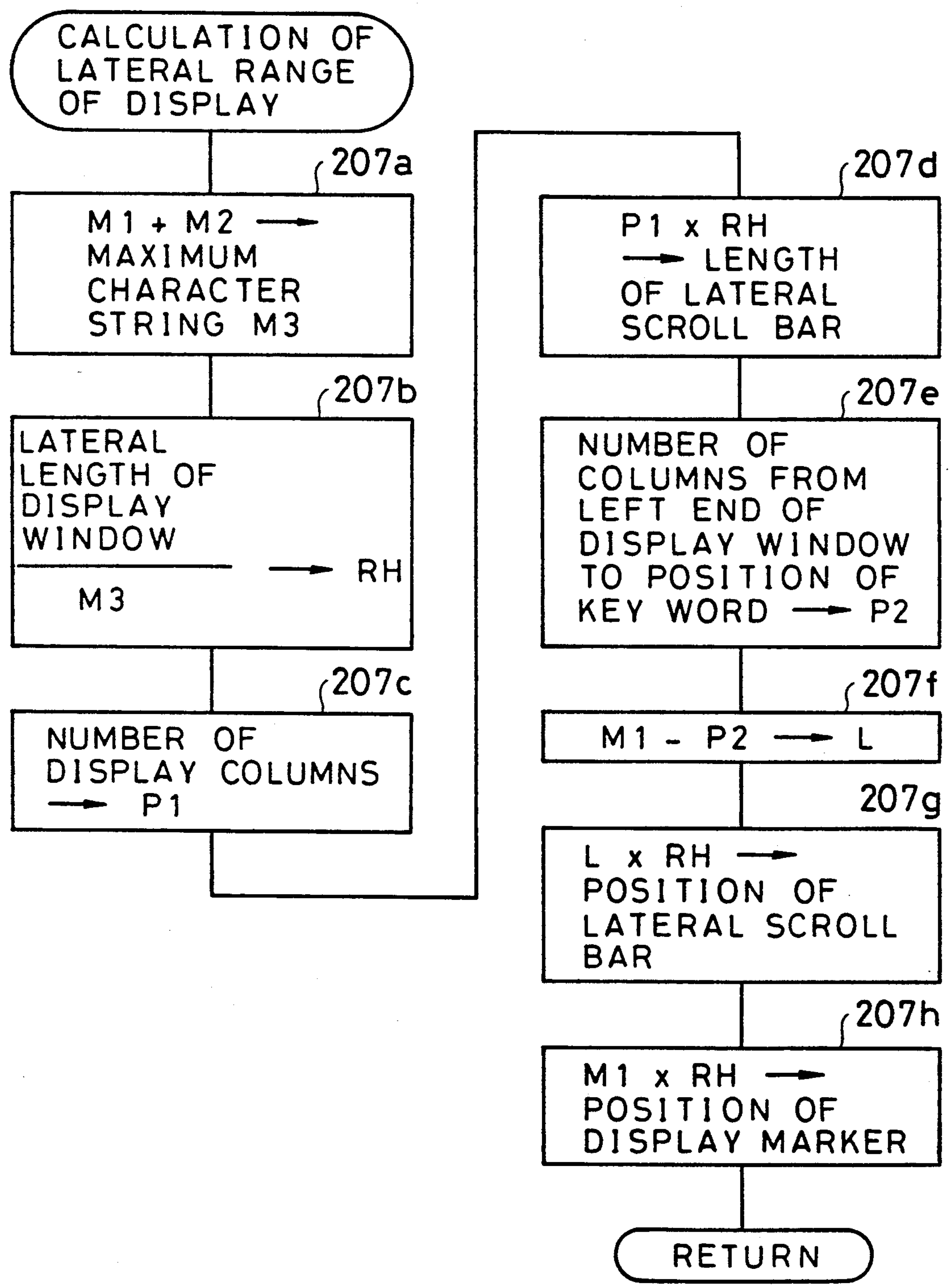
Figure 6:
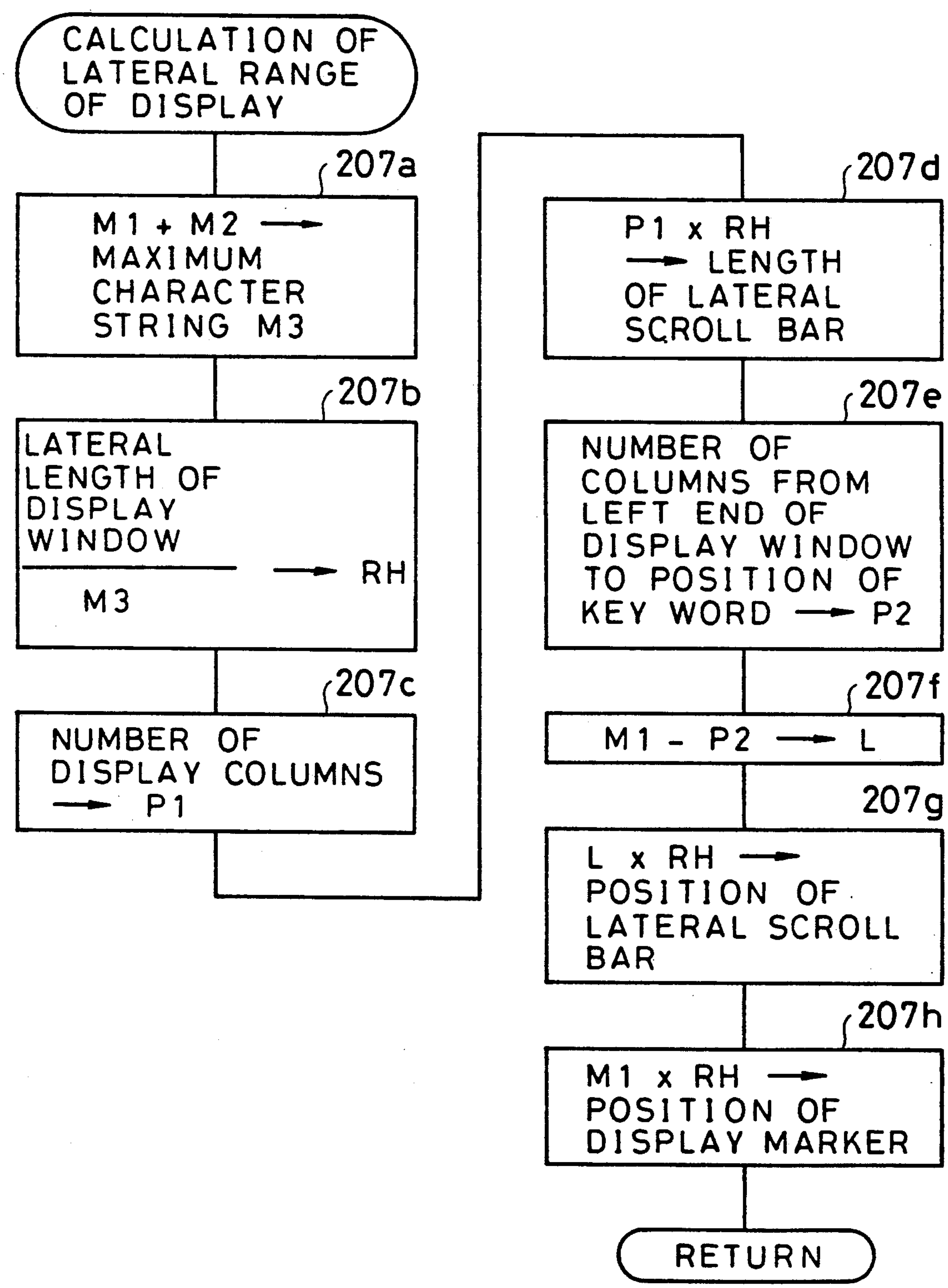

FIG. 6 is a detailed flowchart of calculation of the lateral display range in Step 207 of FIG. 3.

In a calculation of the lateral display range, first, M1 and M2 obtained in the sentence display processing in FIG. 5 are added, and a sum thereof is taken as the maximum character string M3 (Step 207a), and the lateral length of the display window 10 shown in dots is divided by the maximum character string M3, and a quotient thereof is taken as RH (unit, dot) (Step 207b).

Subsequently, the number of display rows in the display window 10 is calculated, being taken as Pl (Step 207c), and the length of the lateral scroll bar 13 is calculated in dots from P1×RH (Step 207d).

The number of columns from the left end of the display window 10 to the position of the retrieval keyword is then calculated, being taken as P2 (Step 207e), and P2 is subtracted from M1, that is, the number of character columns hidden behind the left portion from the display window 10 is calculated, being taken as L (Step 207f), and the position of the lateral scroll bar 13 is calculated in dots from L×RH (Step 207g), and further the position of the display marker 12 is calculated from M1×RH (Step 207h).

Thus, the position and the ratio with respect to the retrieved data are displayed by the longitudinal scroll bar 15 and the lateral scroll bar 13, and further the position of the retrieval keyword is displayed as the display marker 12.

In addition, in this embodiment, the longitudinal scroll bar and the lateral scroll bar are displayed respectively by frames, and the display marker 12 is displayed by an arrow mark, but these graphic forms may be replaced by other graphic forms such as a line with graduation or a color line segment for the scroll bar and a triangle mark or a black circle mark for the display marker.

As described above, in accordance with the present invention, the position and the ratio in the lateral direction of the display data displayed on the screen with respect to the whole display data capable of displaying on the screen of the displaying apparatus are displayed in graphic forms, and therefore the position and the ratio of the display data with respect to the whole data can be immediately recognized on the screen.

What is claimed is:

1. A data displaying apparatus comprising:

storing means for storing one or more data items, displaying means responsive to said storing means for displaying one or more of said stored data items which can be displayed on a screen as display data, each said data item displayed corresponding to one lateral line of display, data length calculating means responsive to said storage means for calculating a maximum data length in the lateral direction for data items which can be displayed by calculating a sum of maximum lengths to the left and right of a predetermined position within each said data item which can be displayed on the screen by left scrolling and right scrolling from said predetermined position, said data length calculating means including position calculating means for calculating the position in the lateral direction of display data as displayed on the screen with respect to said maximum data length, said data length calculating means further including ratio calculating means for calculating a ratio in the lateral direction of the length of the display data displayed on the screen to said maximum display data calculated by the data length calculating means, and display controlling means responsive to said data length calculating means for causing the display of the position and the ratio of the display data calculated by the position calculating means and the ratio calculating means on the screen in a graphic form, said display controlling means including means controlling said displaying means to display said display data on the screen such that key data within each said displayed data item is position justified at said predetermined position.

2. A data displaying apparatus in accordance with claim 1, wherein the data items stored in the storing means and the display data displayed on the screen of said displaying means comprise sentences including a retrieval keyword.

3. A data displaying apparatus in accordance with claim 2, wherein said predetermined position is a posi tion of the retrieval keyword.

4. A data displaying apparatus in accordance with claim 1, wherein the graphic form displayed on the screen by the display controlling means is formed by a bar-shaped frame and a scroll bar positioned in said frame.

5. A data displaying apparatus in accordance with claim 4, which further comprises marker displaying means for displaying a display marker at a position in said bar-shaped frame corresponding to said predetermined position.

6. A data displaying apparatus in accordance with claim 1, wherein the data length calculating means, the position calculating means, the ratio calculating means and the display controlling means are constituted with a micro computer comprising a CPU, ROM, RAM and I/O port.

7. A data displaying apparatus in accordance with claim 1, wherein the storing means is a RAM.

8. A data displaying apparatus as in claim 1 wherein said display controlling means further includes means for controlling said display data to be displayed within a display window of said screen.

9. A data displaying apparatus as in claim 8 further including means for determining the position and the ratio of the longitudinal length of said display window with respect to said one or more of said stored data items which can be displayed as display data.

10. A data displaying apparatus as in claim 9 wherein said display controlling means further includes means responsive to said means for determining for controlling said displaying means to display the position and ratio produced by said means for determining to be displayed on said screen in graphic form.

* * * * *